United States Patent
Kjær et al.

(10) Patent No.: US 10,378,513 B2
(45) Date of Patent: Aug. 13, 2019

(54) SPEED MANAGEMENT OF A WIND TURBINE WHEN SWITCHING ELECTRICAL CONFIGURATIONS

(71) Applicant: VESTAS WIND SYSTEMS A/S, Aarhus N (DK)

(72) Inventors: Martin Ansbjerg Kjær, Harlev J (DK); Peter Koldkjær, Aarhus N (DK); Rasmus Molgaard Hviid Knudsen, Randers (DK); Maryam Soleimanzadeh, Haarlem (NL); Martin Møller Sørensen, Aarhus C (DK); Ali Zaib, Aalborg (DK); Arvishwa Kumar Singh, Uttar Pradesh (IN); Poul Brandt Christensen, Ry (DK); Michael Houlind Jensen, Esbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 550 days.

(21) Appl. No.: 14/916,618

(22) PCT Filed: Sep. 3, 2014

(86) PCT No.: PCT/DK2014/050269
§ 371 (c)(1),
(2) Date: Mar. 4, 2016

(87) PCT Pub. No.: WO2015/032409
PCT Pub. Date: Mar. 12, 2015

(65) Prior Publication Data
US 2016/0208781 A1    Jul. 21, 2016

(30) Foreign Application Priority Data

Sep. 5, 2013 (IN) .......................... 2633/DEL/2013
Dec. 3, 2013 (DK) ................................ 2013 70740

(51) Int. Cl.
*F03D 1/06* (2006.01)
*F03D 7/02* (2006.01)
(Continued)

(52) U.S. Cl.
CPC ............... *F03D 7/028* (2013.01); *F03D 1/06* (2013.01); *F03D 7/0272* (2013.01); *F03D 7/042* (2013.01);
(Continued)

(58) Field of Classification Search
CPC .......... F03D 7/028; F03D 9/25; F03D 7/0272; G05F 11/66
(Continued)

(56) References Cited

U.S. PATENT DOCUMENTS 7,352,076 B1 * 4/2008 Gabrys ................... F03D 3/005
290/44
2003/0151259 A1    8/2003 Feddersen et al.
(Continued)

FOREIGN PATENT DOCUMENTS

AU          9073582 A     5/1983
CN          102472250 A   5/2012
(Continued)

OTHER PUBLICATIONS

International Search Report for PCT/DK2014/050269, dated Nov. 6, 2014.
(Continued)

*Primary Examiner* — Carlos R Ortiz Rodriguez
*Assistant Examiner* — Joshua T Sanders
(74) *Attorney, Agent, or Firm* — Patterson + Sheridan, LLP

(57) ABSTRACT

To efficiently run a wind turbine in varying wind speeds, the wind turbine may be configured to switch between two different electrical configurations that offer different effi-
(Continued)

ciencies depending on wind speed. For example, a star configuration may be preferred during low wind speeds while a delta configuration is preferred for high wind speeds. Before switching, the power output by the turbine's generator may be driven to zero. Doing so, however, removes load from the rotor blades which cause the rotor speed to increase. Instead, the rotor speed may be controlled such that the speed stays at or above the speed of the rotor immediately before the generator power is ramped down. Maintaining rotor speed at or slightly above the current speed while switching between electrical configurations may mitigate the torque change experienced by the turbine and reduce the likelihood of structural failure.

17 Claims, 6 Drawing Sheets

(51) Int. Cl.
*F03D 7/04* (2006.01)
*F03D 9/00* (2016.01)
*G05F 1/66* (2006.01)
*F03D 9/25* (2016.01)
(52) U.S. Cl.
CPC ............... *F03D 7/047* (2013.01); *F03D 9/25* (2016.05); *G05F 1/66* (2013.01); *F05B 2270/332* (2013.01); *Y02E 10/721* (2013.01); *Y02E 10/723* (2013.01)

(58) Field of Classification Search
USPC ......................................................... 700/287
See application file for complete search history.

(56) References Cited

U.S. PATENT DOCUMENTS

| | | | | |
|---|---|---|---|---|
| 2011/0140421 | A1* | 6/2011 | Scholte-Wassink | H02K 3/28 290/44 |
| 2013/0175966 | A1* | 7/2013 | Astigarraga | H02P 6/08 318/497 |

FOREIGN PATENT DOCUMENTS

| | | |
|---|---|---|
| CN | 102916446 A | 2/2013 |
| CN | 103206344 A | 7/2013 |
| EP | 1959135 A2 | 8/2008 |
| WO | 2007028019 A1 | 3/2007 |

OTHER PUBLICATIONS

International Search Report for PCT/DK2014/050269, dated Nov. 11, 2014.
Danish Search Report for PA 2013 70740, dated Jun. 19, 2014.
State Intellectual Property Office (SIPO) of the People's Republic of China Notification of First Office Action for Application No. 20140048955.5 dated Dec. 19, 2017.

* cited by examiner

SPEED MANAGEMENT OF A WIND TURBINE WHEN SWITCHING ELECTRICAL CONFIGURATIONS

BACKGROUND

Field of the Invention

Embodiments presented in this disclosure generally relate to switching generator configurations, and more specifically, to maintaining a substantially constant rotor speed when switching between the generator configurations.

Description of the Related Art

Unlike some forms of power generation systems, wind power systems are dependent on varying environmental conditions for generating power. Specifically, the power generated by a turbine may vary depending on the wind speed in the wind farm. A wind turbine may produce power at different efficiencies depending on the wind speed. As used herein, the turbine's efficiency is a measure of the turbine's ability to convert wind energy into electrical energy. For example, if the turbine is configured to operate optimally at wind speeds around 10 meters/second but the current wind speed is around 5 meters/second, the turbine may produce power at a reduced efficiency. Accordingly, much of the effort in wind turbine design is focused on designing wind turbines that can generate power efficiently in varying environmental conditions.

SUMMARY

One embodiment of the present disclosure includes a controller for a wind turbine and a method for controlling the wind turbine. The controller and method include, upon determining to switch between electrical configurations when operating at a pre-switch rotor speed, decreasing an output power produced by a generator in the wind turbine. While decreasing the output power, the controller and method adjust a parameter associated with a rotor of the wind turbine to maintain the speed of the rotor at or above at least one of the pre-switch rotor speed and a desired post-switch rotor speed. Upon determining that the output power reaches a predefined power value the controller and method switch between a first electrical configuration associated with the generator to a second electrical configuration. After switching to the second electrical configuration, the controller and method increase the output power produced by the generator in the wind turbine. Furthermore, while increasing the output power, the method and controller adjust the parameter associated with the rotor to maintain the speed of the rotor at or above at least one of the pre-switch rotor speed and a desired post-switch rotor speed.

Another embodiment presented herein is a wind turbine that includes a generator, a rotor coupled to the generator, and a controller. The controller is configured to, upon determining to switch between electrical configurations when operating at a pre-switch rotor speed, decrease an output power produced by the generator and, while decreasing the output power, adjust a parameter associated with the rotor to maintain the speed of the rotor at or above at least one of the pre-switch rotor speed and a desired post-switch rotor speed. Upon determining that the output power reaches a predefined power value, the controller is configured to switch between a first electrical configuration associated with the generator to a second electrical configuration. After switching to the second electrical configuration, the controller is also configured to increase the output power produced by the generator and, while increasing the output power, adjusting the parameter associated with the rotor to maintain the speed of the rotor at or above at least one of the pre-switch rotor speed and a desired post-switch rotor speed.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
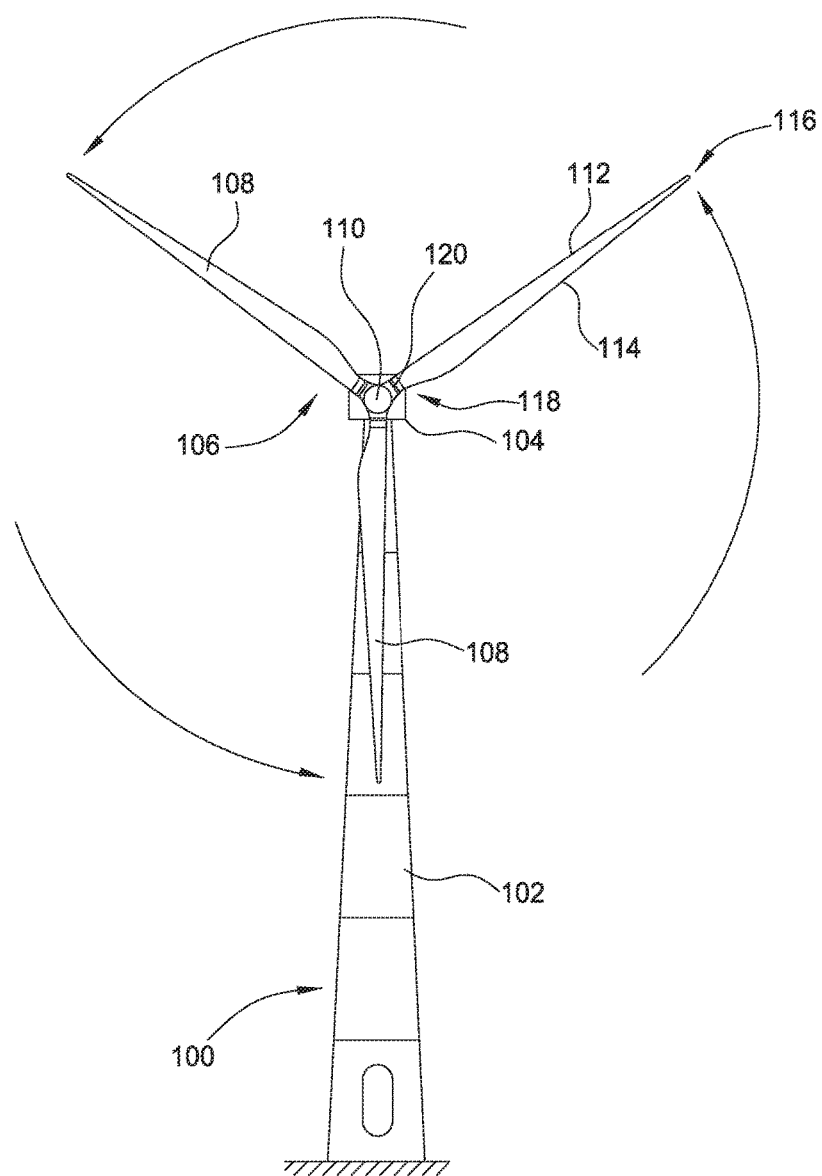
FIG. 1 illustrates a diagrammatic view of a wind turbine, according to one embodiment described herein.

To efficiently run a wind turbine in varying wind speeds, the wind turbine may switch between two or more different electrical configurations. In one embodiment, the turbine may include relays that reconfigure the generator into either a star configuration or a delta configuration. The two electrical configurations may offer different efficiencies depending on the wind speed. The star configuration may be more efficient than the delta configuration at low speeds, but once the wind speed increases such that the output power of the generator exceeds a star power restriction threshold, the wind turbine may have to be de-rated. The delta configuration, in contrast, may permit the generator to produce power in excess of the star power restriction threshold but may suffer from inefficiencies when producing lower power—i.e., when wind speed decreases.

In one embodiment, the turbine is configured to switch the generator between two different electrical configurations—e.g., from star to delta or from delta to star—based on the current wind conditions or the amount of power the generator is producing. Before switching, the power output by the generator may be driven to zero. Doing so, however, removes load from the drive train, which, if not accounted for, causes the rotor speed to increase. In one embodiment, the rotor speed may be controlled such that the speed decreases to a predefined connection speed as the generator power ramps to zero. However, changing the speed of the rotor changes the force exerted by the rotor on the turbine. Accordingly, the turbine may control the rotor speed using, for example, blade pitch or brakes so that the rotor speed stays approximately constant throughout the switching process. In one embodiment, the rotor speed may be maintained at or above the speed of the rotor immediately before the generator power is ramped down (i.e., a pre-switch rotor speed) or the desired rotor speed after the switching has occurred and the generator output power has ramped up (i.e., a post-switch rotor speed). Maintaining the rotor speed at or above the pre- or post-switch rotor speed while switching between electrical configurations may mitigate the torque change experienced by the turbine tower and may reduce the likelihood of structural failure.

Because switching between electrical configurations may fatigue the turbine, the wind turbine may also establish a plurality of thresholds with varying criteria for determining when to switch between the electrical configurations. For example, when switching from delta to star, the turbine may wait until the generator output power falls below 200 kW for sixty seconds. However, the wind farm may experience a steady, constant wind that causes the generator to output 300 kW for a prolonged period. Remaining in the delta configuration during this time period will cause the turbine to be less efficient than if the turbine were in the star configuration. Instead, the turbine may use a plurality of thresholds where the time and power criteria increase. For example, the wind turbine may switch configurations if the power output is below 200 kW for five minutes or the output power is below 300 kW for one hour. In this manner, the plurality of thresholds may capture the scenario mentioned above where the turbine may benefit from switching electrical configurations. However, by increasing the time constraint, the turbine may limit inadvertently switching if the change in generator output is brief and the turbine has to switch back to the previous electrical configuration.

In one embodiment, the wind turbine may track the number of electrical configuration switches performed by the turbine. Because the switches fatigue the turbine, a controller may update the criteria used to determine when to switch between the electrical configurations to decrease the switching rate, and thus, reduce the fatigue on the turbine. For example, if the turbine exceeds its switching budget, the controller may increase the time associated with a threshold or keep the turbine in only one electrical configuration until the total number of switches is within the switching budget. Reducing the turbine's switch rate may prevent the turbine tower from prematurely aging which may reduce the likelihood of unexpected maintenance costs.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

FIG. 1 illustrates a diagrammatic view of a horizontal-axis wind turbine generator 100. The wind turbine generator 100 typically includes a tower 102 and a wind turbine nacelle 104 located at the top of the tower 102. A wind turbine rotor 106 may be connected with the nacelle 104 through a low speed shaft extending out of the nacelle 104. The wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108. Blade pitch control is common on modern wind turbines and is used among others systems to maximize the power generated below rated wind speeds and to reduce the power generated above the rated wind speed to prevent excessive loading on turbine components, e.g., the generator and gearbox.

Figure 2A:
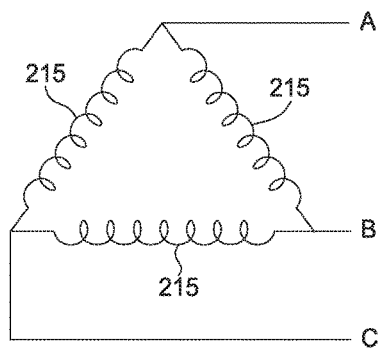
FIGS. 2A-2C are generator configurations for generating power, according to embodiments presented herein.
Figure 2B:
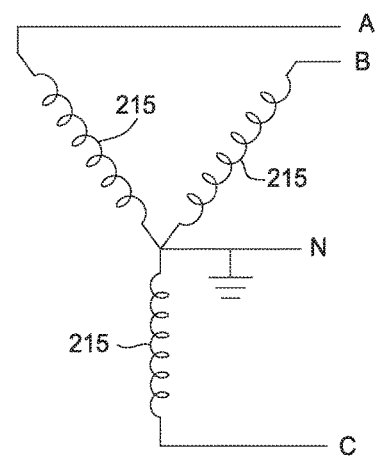
Figure 2C:
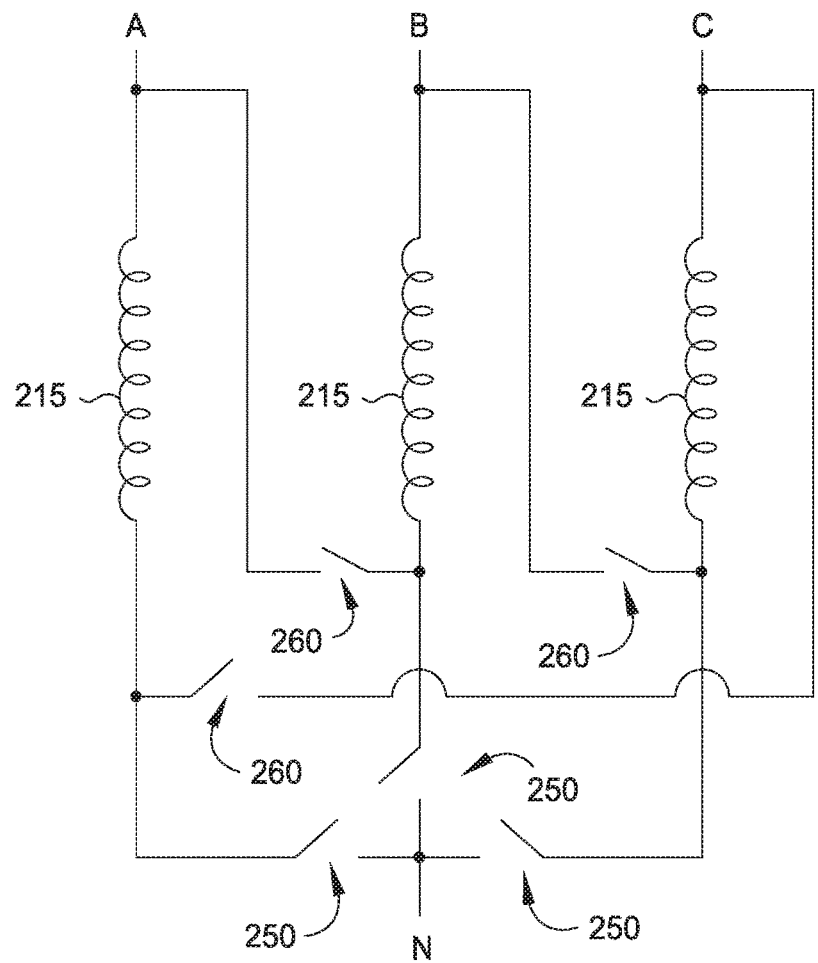

FIGS. 2A-2C are generator configurations for generating power, according to embodiments presented herein. Specifically, FIG. 2A illustrates windings 215 of a generator that are configured in a delta configuration where each end of the winding 215 is coupled to the end of another winding 215. The three nodes A, B, and C may be separate phases of a three-phase power signal. Although the embodiments herein are discussed in the context of a three-phase delta configuration (i.e., one example of a mesh electrical configuration), the embodiments herein may be used with electrical systems with any number of phases.

FIG. 2B illustrates windings 215 of a generator configured in a star (or "wye") configuration. As shown, the three windings 215 meet at a neutral node N which sets the reference voltage for the three windings 215. As in FIG. 2A, the nodes A, B, and C may output a three-phase power signal; however, the embodiments herein are not limited to such. Indeed, the star configuration may be used to generate a power signal with any number of phases.

In one embodiment, a wind turbine may include switches or relays for rearranging the connections of the windings 215 to switch between the delta configuration (e.g., a first electrical configuration) shown in FIG. 2A to the star configuration (e.g., a second electrical configuration) shown in FIG. 2B, and vice versa. For example, the generator may be rated for producing 3 MW of power. However, the generator may be able to produce this maximum amount power only at certain wind speeds. At lower winds speeds, the generator may output power less than 3 MW. When generating less power (e.g., less than 500 kVV) the generator may be able to produce electrical power more efficiently in the star configuration than the delta configuration. This is because, while in the delta configuration, the rotor may operate at a speed above the most aerodynamical optimal speed, and thus, generate less power than would be possible if a star configuration were used. Also, the generator itself may experience improved efficiency when in the star configuration rather than the delta configuration. On the other hand, the star configuration may have a star power restriction threshold that prevents the generator from outputting power above this threshold. If the wind speed permits the generator to produce power above the star power restriction threshold (e.g., 900 kW) the turbine may have to be de-rated so as to not produce power above this maximum. Thus, as the wind speed increases, the turbine may switch to the delta configuration to avoid the limitations of the star configuration.

FIG. 2C illustrates a generator system for switching between the delta and star configurations shown in FIGS. 2A and 2B. Here, the ends of the windings may be coupled to the switching elements 250 and 260. To form the delta configuration, the switching elements 260 are closed while the switching elements 250 are open to couple each end of the windings 215 to a shared node—i.e., node A, B, or C. In contrast, to form the star configuration, the switching elements 260 are open and the switching elements 250 are closed to couple one end of each winding 215 to neutral. In this manner, the generator windings 215 may be reconfigured based on current environmental conditions and generator output power.

Figure 3:
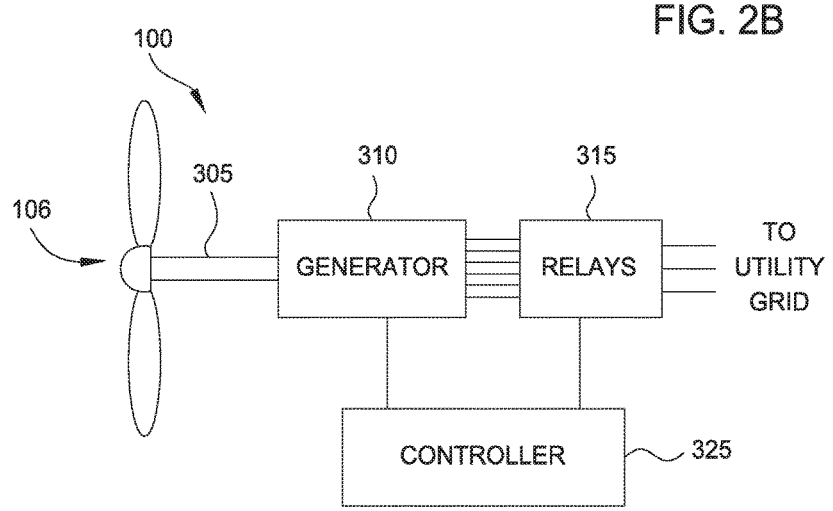
FIG. 3 is a turbine system for switching between generator configurations, according to one embodiment presented herein.

FIG. 3 is a turbine 100 for switching between generator configurations, according to one embodiment presented herein. Specifically, the turbine 100 includes the rotor 106 connected to a generator 310 (e.g., a doubly-fed induction generator or permanent magnet generator) via a shaft 305. Although not shown, the wind turbine 100 may include a gear box for changing the relatively slow rotational speed of the rotor 106 to a higher rotational speed for rotating the windings of generator 310. The output of the generator 310 is coupled to relays 315 (e.g., physical switches) that may reconfigure the outputs of the generator 310 into the different electrical configurations shown in FIGS. 2A and 2B—e.g., star or delta configurations. Specifically, the end of the windings (i.e., six wires in a three-phase generator) are fed into the relays 315 which may be arranged as shown in FIG. 2C to switch between electrical configurations. In another embodiment, the relays 315 may be incorporated into the generator 310 to internally switch between electrical configurations. Furthermore, the outputs of the generator 310 may be fed into one or more power converters that perform an AC-DC and DC-AC conversions to provide power to the utility grid at the desired grid frequency, but this is not a requirement.

Turbine 100 includes a controller 325 (e.g., one or more computing devices) that is coupled to the various components in the turbine—e.g., generator 310 and relays 315. The controller 325 may send instructions to these components for changing the power produced by the wind turbine 100 as discussed herein using control logic embodied within, e.g., firmware or a software application. The controller 325 may be located on the wind turbine 100 itself or may be located remotely (e.g., part of a SCADA) and is communicatively coupled to the turbine 100 via a wired or wireless network.

As will be discussed in more detail below, the controller 325 may send instructions to the various components to change the electrical configuration of the generator 310 based on wind conditions. That is, the controller 325 may switch the electrical configuration of the generator 310 in order to generate electrical power more efficiently. In one embodiment, the controller 325 may compare measured criteria such as power production or wind speed to one or more predefined thresholds to determine when to switch between the electrical configurations.

Figure 4A:
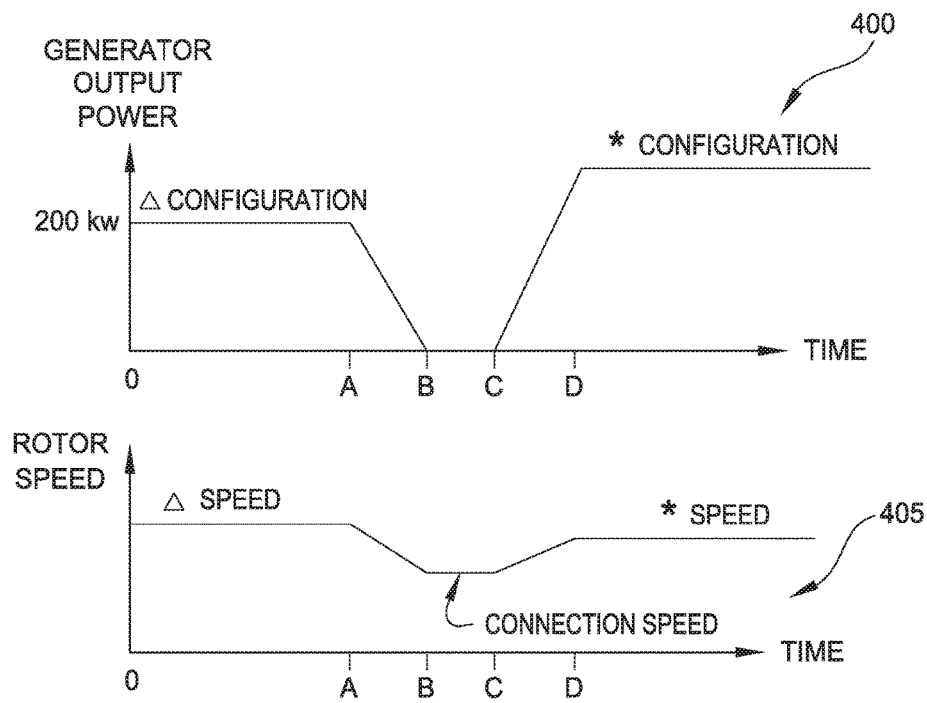
FIGS. 4A-4B are charts that illustrate power and rotor speed when switching between generator configurations, according to embodiments presented herein.
Figure 4B:
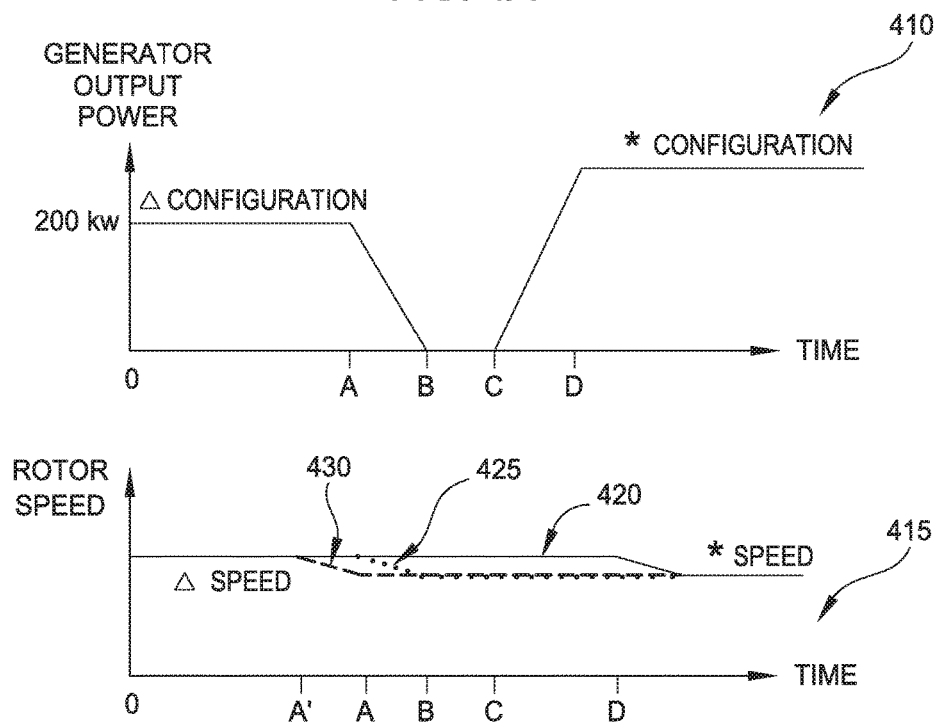

FIGS. 4A-4B are charts that illustrate power and rotor speed when switching between generator configurations, according to embodiments presented herein. Chart 400 in FIG. 4A illustrates the output power of a generator switching from a delta configuration to a star configuration. Before switching the electrical configurations, at time A, the controller may send a control instruction to the generator which instructs the generator to ramp down such that no power, or substantially no power, is produced by the generator. Doing so effectively removes the generator from the power grid and enables the turbine to safely switch to a different electrical configuration. At time B, the controller may instruct the relays to reconfigure the winding ends of the generator from the delta configuration to the star configuration. At time C, the controller may ramp up the power produced by the generator until it reaches the desired power setting based on the current wind conditions. That is, for given wind conditions, the controller may set the power of output of the generator at an optimal power value (or within a range of optimal power values). Because the wind turbine is now in the star configuration, the turbine is able to output power more efficiently in lower wind speeds.

The example shown in chart 400 also applies when switching from the star configuration to the delta configuration. That is, after determining to switch, the controller may ramp down the power before instructing the relays to reconfigure the generator into the delta configuration. Once complete, the generator power may be ramped up the desired or optical power output for the current wind speed.

Chart 405 illustrates the rotor rotational speed when switching from the star configuration to the delta configuration. In one embodiment, the rotational speed of the rotor in star configuration may be approximately 12 RPM. Between time A and B, the controller slows down the rotor speed while ramping down the generator power output as shown by chart 400. For example, the controller may be coupled to the blade pitching system that permits the controller to pitch the blades into the wind (i.e., rotates the blade such that the blade's leading edge turns in a direction parallel to the direction of the wind) thereby reducing the amount of energy the wind turbine captures from the wind. Additionally or alternatively, the controller may use a braking system to decrease the rotor speed as shown. If the controller did not use the blade pitching system or a rotor brake to slow down the rotor speed, the rotor speed would increase as the generator power output decreases. Because the generator serves as a load on the drive train, producing less power at the generator reduces the load on the drive train thereby increasing the rotor rotational speed. Thus, as shown in chart 405, the controller may use the blade pitching system or braking system to reduce the rotor speed as the load of the generator is reduced.

Between times B and C, the lower rotor speed (referred to as the connection speed and may be approximately 11.5 RPM) may be maintained while the generator switches electrical configurations. At time C, the controller may begin to increase the rotor speed by, for example, pitching the blades out of the wind (i.e., rotates the blade such that the blade's leading edge turns in a direction perpendicular to the direction of the wind). At the same time, the controller may increase the power output of the generator which increases the load on the blade. However, because the controller permits the rotor to increase the energy being pulled from the wind, the rotor speed does not slow down, but instead, increases. At time D, the rotor reaches the optimal speed for the delta configuration which may be approximately 13 RPM.

As shown by charts 400 and 405, changing electrical configurations may change the thrust or torque experienced by the wind turbine. Specifically, as shown at time A, the controller decreases the rotor speed as the generator load decreases. The decreased load and rotor speed reduces the force (e.g., a thrust or torque) the rotor exerts on the wind turbine. This changed force may fatigue the wind turbine. Furthermore, because the rotor speed is reduced to the low connection speed during times B and C when the electrical configuration switches, the controller has to ramp rotor speed up to the optimal speed at time D. This change to the blade's tip-speed may cause an additional change in the force exerted by the rotor on the turbine which may further fatigue the turbine. Experimental data has shown that 2-3% of the tower fatigue occurs when switching between electrical configurations because of the changed force mentioned above. Accordingly, reducing the change in the force when switching between electrical configurations may reduce design costs as well as maintenance costs for repairing structural damage in the turbine.

FIG. 4B illustrates an example of switching between delta and star configurations for reducing the amount that the force exerted by the rotor on the turbine tower changes. Like chart 400, chart 410 in FIG. 4B illustrates the power output of a generator being changed from a delta configuration to a star configuration. Chart 415, however, differs from chart 405 by illustrating embodiments where the rotor speed is switched between the pre-switch speed (i.e., before time A) to the desired post-switch speed (i.e., after time D) without first decreasing to the connection speed. Specifically, chart 415 illustrates that the controller may reduce the changed force exerted by the rotor on the turbine by maintaining a rotor speed that is substantially constant (or slightly increased) during the switching process. To do so, chart 415 illustrates three different embodiments (solid line 420, dotted line 425, and dashed line 430) where the change in the force caused by decreasing the rotor speed to the connection speed and then ramping the rotor speed from the connection speed to the optimal speed is avoided. Although the change of the force resulting from decreasing the generator load may still change the force the rotor exerts on the tower, the examples shown in chart 415 avoid the change in the force resulting from reducing the rotor speed to the connection speed and then increasing the rotor speed back to the original speed before time A.

The solid line 420 illustrates maintaining the rotor speed at the pre-switch rotor speed throughout the switching process. At time A, the controller may begin to pitch into the wind or brake the rotor in order to maintain the same speed. That is, because the generator load is decreasing, the controller may adjust the blade pitch to allow more wind to pass through the rotor plane, and thus, maintain the same speed. At time C when the generator load begins to increase as the power output increases, the controller may begin to pitch the blades out of the wind to compensate for the increasing generator load. Nonetheless, the controller may ensure that the rotor speed maintains substantially constant during the ramping down (i.e., time A through time B) and ramping up (i.e., time C through time D) of the generator. At time D, the controller may permit the rotor speed to change to the desired optimal post-switch rotor speed associated with the star configuration for the current wind conditions.

Dotted line 425 illustrates that the controller may decrease the rotor speed to the optimal speed for the star configuration (i.e., the post-switching speed) before switching the generator. That is, the controller may proactively ramp the rotor speed to the desired speed for the new electrical configuration as power generation is reduced. For example, the controller may pitch the blades after time A. Because the generator load decreases, the controller pitches the blades so that the rotor speed decreases despite the decreasing generator load. Beginning at time B, the controller adjusts the blade pitch to maintain the rotor speed at a constant value during time B through time C when the generator switches to the star configuration. At time D when power generation resumes, the controller may pitch the blades out of the wind to compensate for the increased generator load. In this manner, the controller may ensure that the optimal rotor speed is maintained while the generator power output is increased to its optimal value.

Dashed line 430, like dotted line 425, illustrates that the controller may decrease the rotor speed to the optimal speed of the star configuration before switching the generator to that configuration. However, unlike dotted line 425, dashed line 430 illustrates that the rotor speed may be changed to the optimal value before ramping down the generator power at time A. In one embodiment, at time A', the controller may pitch the blades into the wind to decrease the rotor speed even as the generator's output power remains constant. This rotor speed may be non-optimal for the delta configuration, but this inefficient operation state is only temporary. At time A, the controller may further adjust the blade pitch as the generator load decreases to maintain a constant rotor speed between time A and B. Similarly, at time C, the controller may pitch the blades in the opposite direction in order to compensate for the increasing generator load. At time D, the blade pitch is set at the setting that results in the optimal speed of the rotor and power output of the generator.

The lines 420, 425, and 430 illustrate rotor speed management techniques where the force change from ramping the rotor speed down to the connection speed and back to the original speed is mitigated thereby reducing the fatigue of the turbine. In one embodiment, the connection speed may still be used in special circumstances, e.g., when the rotor blade is accelerating from a standstill, but is not used when switching between electrical configuration during normal operation. All three examples illustrate that while switching the electrical configuration (e.g., between time B and C) the rotor speed is maintained at or above the pre- or post-switching speeds of the rotor.

Although not shown in FIGS. 4A-4B, as the wind conditions change—i.e., the wind speed increases—the blades may be further pitched to increase the energy captured from the wind. In one embodiment, the power output of the generator may also be increased so that the rotor speed remains at the optimal speed. As such, charts 405 and 415 may illustrate the two optimal speeds for delta and star configurations where the star configuration has a slightly higher optimal speed than the delta configuration.

Figure 5:
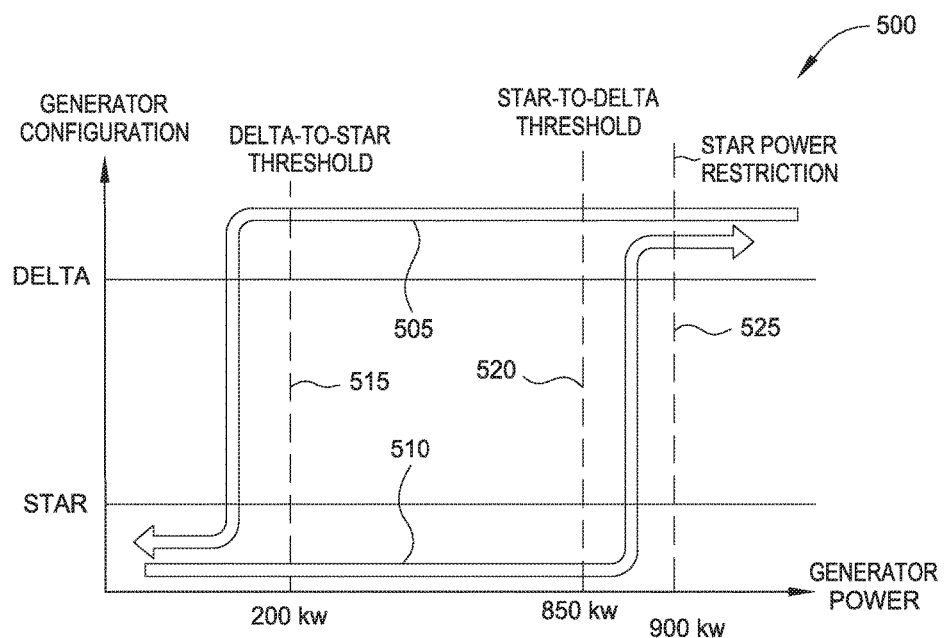
FIG. 5 illustrates a diagram for switching between star and delta configurations, according to one embodiment presented herein.

FIG. 5 illustrates a diagram for switching between star and delta configurations, according to one embodiment presented herein. Specifically, chart 500 illustrates switching between star and delta configurations based on the power output by the generator. In one embodiment, the power output by the generator may be directly correlated with the current wind speed at the rotor. Chart 500 includes two thresholds for determining when to switch between the configurations. Path 505 illustrates switching from the delta configuration to the star configuration using threshold 515 while path 510 illustrates switching from the star configuration to the delta configuration using threshold 520. In one embodiment, the controller may constantly monitor the output of the generator and compare the output with the thresholds 515 and 520 shown in chart 500. As shown by path 505, if the generator output falls below the delta-to-star threshold 515 (and assuming the generator is currently configured in the delta configuration), the controller instructs the turbine to switch to the star configuration. Conversely, if the generator output exceeds the star-to-delta threshold 520, path 510 illustrates switching from the star configuration to the delta configuration. In chart 500, the star-to-delta threshold 520 is less than the star power restriction threshold 525. The generator cannot produce more than 900 kW when in the star configuration.

The star-to-delta and delta-to-star thresholds 515 and 520 shown in chart 500 are examples of possible threshold limits used to control the turbine to more efficiently produce power in changing environmental conditions. The power criteria associated with the thresholds 515 and 520 may change depending on the particular implantation. Furthermore, the star power restriction threshold 525 may also be different depending on the type of generator used in the wind turbine (i.e., may be higher or lower than 900 kW). In one embodiment, the controller may also consider time in addition to the current power output of the generator when switching between electrical configurations. For example, the controller may switch from delta to star after the generator output power falls below 200 kW for more than sixty seconds.

Figure 6:
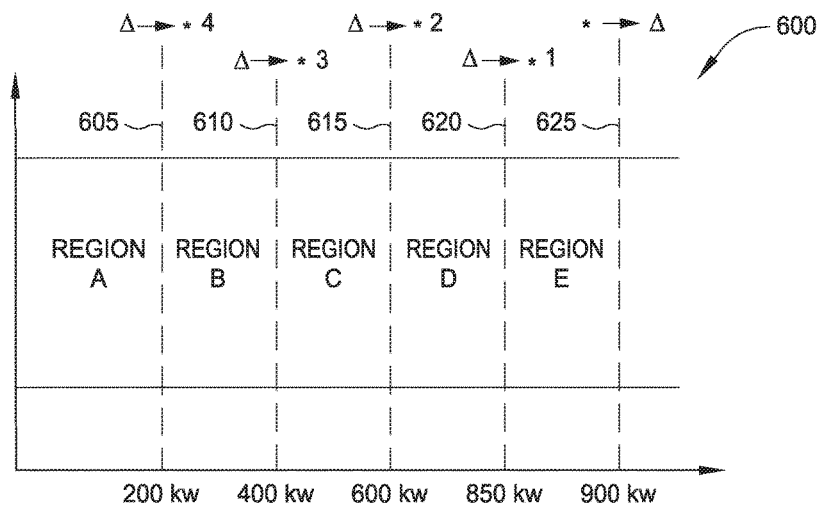
FIG. 6 illustrates a diagram with a plurality of thresholds for switching between star and delta configurations, according to one embodiment presented herein.

FIG. 6 illustrates a diagram with a plurality of thresholds for switching between star and delta configurations, according to one embodiment presented herein. The chart 600 illustrates dividing the x-axis into a plurality of different regions—Regions A-E—that are separated by thresholds 605, 610, 615, 620, and 625. Specifically, chart 500 illustrates using four different delta-to-star (Δ→*) thresholds 605, 610, 615, 620 where each threshold is associated with a different output value. In addition, the delta-to-star thresholds may be associated with an increasing time criteria. Table 1 illustrates different time criteria that may be associated with the regions defined by the thresholds.

TABLE 1

| Threshold | Power Range | Time Criteria |
| --- | --- | --- |
| 605 | 200 kW | 60 sec |
| 610 | 400 kW | 15 minutes |
| 615 | 600 kW | 1 hour |
| 620 | 850 kW | 2 hours |

As shown in Table 1, to switch from delta to star when the current generator output is less than threshold 605, the power must remain at or below 200 kW for at least 60 seconds. However, to switch from delta to star when the current generator output power is below threshold 620, the output power must remain below 850 kW for 2 hours. Dividing the power output in the plurality of regions based on a plurality of thresholds and customizing the timing constraint for each region enables the controller to identify a situation where the turbine is experiencing lower but constant wind speeds. Because the star configuration more efficiently generates electrical power (until the power output exceeds the star power restriction threshold), the various thresholds provide additional granularity for identifying situations where the star configuration may be preferred. In addition, increasing the time criteria as the power values associated with the thresholds increases helps ensure the wind speed is constant enough so that the controller will not have to change the turbine back to the delta configuration—i.e., if the output power exceeds the star-to-delta (*→Δ) threshold 625—to avoid de-rating the turbine.

In one embodiment, the controller may reset the timer if the generator output exceeds a threshold. For example, if the current generator output is below threshold 615 (which has a time criteria of 1 hour) for thirty minutes but then exceeds threshold 615, the controller may reset the timer such that if the generator output again falls below threshold 615 the timer begins at zero. However, if the generator output falls below the threshold 610, the controller may allow the timer to continue. For example, if the generator output is below threshold 615 for thirty minutes but then fall below threshold 610 for only five minutes before, the controller may permit the timer associated with threshold 615 to run continuously during this time. Of course, if the generator output is below threshold 610 long enough to satisfy its time constraint—i.e., 15 minutes—the controller may go ahead and switch from the delta to star configurations even if the time constraint for threshold 615 is not satisfied—e.g., the timer value is only 45 minutes. Stated differently, the controller may associate respective timers to each of the thresholds so that the regions A-E defined by the thresholds may be considered independently.

Although not shown in FIG. 6, the logic used by the controller to determine when to switch from star to delta may also be divided into a plurality of regions. For example, Region E may be divided by different thresholds where each threshold has a time constraint that decreases as the power values increase. For example, the generator output may only need to be within 850-900 kW for 5 minutes before switching from star to delta but the output may need to be within 900-950 kW for 1 minute before switching. Customizing the time constraint may enable the controller to preemptively switch from star to delta to reduce the chance that the generator will be de-rated if the wind conditions permit the generator to produce power above the star power restriction threshold.

In one embodiment, the controller may adjust the time constraints based on turbulence experienced by the wind turbine. As used herein, the turbulence is the variation of the wind speed over a set period of time. Thus, greater turbulence may indicate that wind speed has a greater variance—i.e., is less predictable. When experiencing greater turbulence, the controller may increase the time constraints for the respective thresholds to reduce the likelihood the turbine switches between electrical configurations rapidly which may fatigue the turbine unnecessarily. Additionally or alternatively, the controller may change the power values associated with the threshold based on the turbulence. For example, the controller may reduce the power values of the thresholds shown in Table 1 such that turbulent wind conditions do not trigger the switch from, e.g., delta to star. In addition to changing the criteria to be more stringent, the controller may decrease the time constraint (or increase the power ranges) as turbulence decreases. In this manner, the controller may adjust the switching thresholds based on the environmental conditions.

Figure 7:
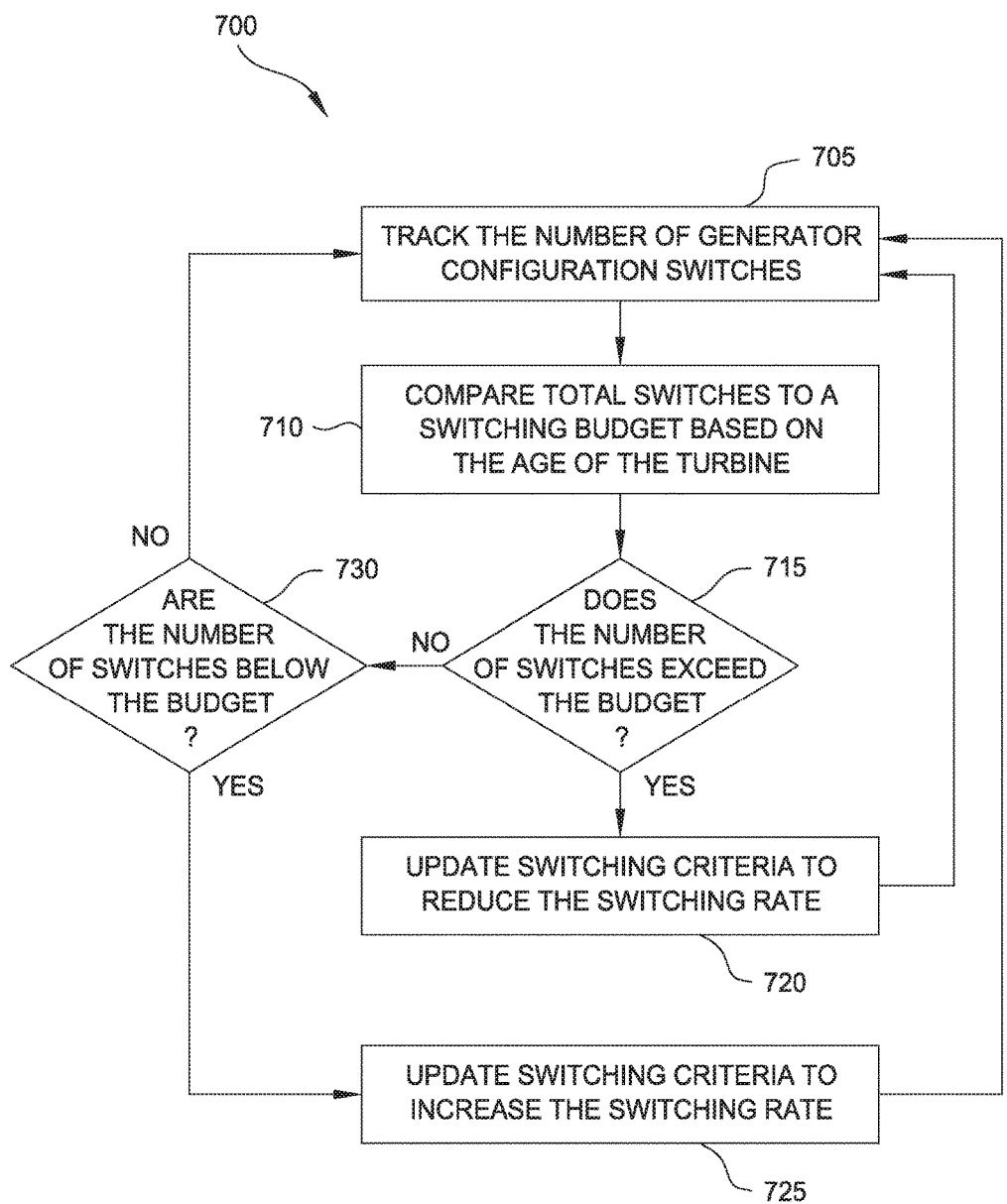
FIG. 7 is a flow chart for adjusting the rate at which a turbine switches between generator configurations, according to one embodiment presented herein.

FIG. 7 is a flow chart for adjusting the rate at which a turbine switches between generator configurations, according to one embodiment presented herein. In addition to changing the criteria used when switching electrical configurations, the controller may also consider historical data to change the frequency or rate at which a turbine switches between configurations. For example, at block 705, the controller may track the number of generator configuration switches—i.e., each time the turbine switches from star-to-delta or delta-to-star—to identify a total number of switches for the turbine. The total number of switches may also include the switches used when stopping and restarting the turbine. For example, when disconnecting the turbine for maintenance or because of unsafe wind speeds, the controller may activate the relays and disconnect the grid from the generator. As such, in one embodiment, the controller may also count these switches (and disconnections) in the total count.

At block 710, the controller compares the total switches of the turbine to a switching budget based on the current age of the turbine. The switching budget may be based on the total number of switches of other turbines that are the same or similar age as the turbine. The budget may also be predefined based on the expected lifespan of the turbine. If the turbine is designed to last for thirty years and experience thirty thousand switches during that time, the controller may use the current age of the turbine to determine the budget. For example, if the wind turbine is five years old, the turbine may have a budget of five thousand switches.

At block 715, the controller determines if the number of switches exceeds the budget. In one embodiment, the switching budget is set to reduce the likelihood that the turbine will wear out or need major repairs before the thirty-year lifespan. As discussed above, switching electrical configurations may fatigue the turbine even if the rotor speed is maintained at a substantially constant speed during switching as shown in FIGS. 4A and 4B. Accordingly, if the structural components are designed to withstand thirty thousand switches, a turbine that switches more than this number increases the likelihood of structural failure before the thirty year lifespan. As such, at block 720, the controller updates the switching criteria to reduce the switching rate if the switching budget is exceeded. Specifically, the controller may increase the time constraints associated with the thresholds (or regions) used to determine when to switch between the electrical configurations. Additionally or alternatively, the controller may shrink the power values associated with the thresholds. Stated differently, the controller may perform the same restrictive actions for reducing the likelihood of switching configurations as done during periods of high turbulence. Doing so may decrease the switching rate associated with the turbine which may, over time, bring the turbine within the switching budget.

In one embodiment, if the turbine exceeds the switching budget, the controller may maintain the turbine in the delta configuration regardless of the current generator output or wind speed. Although the delta configuration is less efficient than the star configuration in low wind speeds, the delta configuration does not cause the turbine to de-rate. For example, if the controller maintains a 3 MW generator in a star configuration, during periods of maximum power generation, the generator may be limited to only 950 kW of power (i.e., the generator produces only a third of the power it could have if the turbine was in the delta configuration) which is more inefficient than operating the generator in a delta configuration at low wind speeds. As such, when the turbine exceeds the switching budget, the controller may force the turbine into the delta configuration and temporarily stop using the thresholds to switch between electrical configurations. In this example, the controller reduces the switching rate to zero until the total number of switches is within the switching budget.

After adjusting the switching criteria, method 700 returns to block 705 to count additional switches and determine whether the new total exceeds the switching budget. If the total number of switches does not exceed the budget, at block 730 the controller may determine if the number of switches is below the budget. For example, the wind turbine may be able to increase the switching rate and still be within the thirty thousand switches over the turbine's life. Accordingly, at block 725, the controller may update to the switching criteria to increase the switching rate. For example, referring to FIG. 6, the time constraints or power ranges associated with each region may be changed such that it becomes easier to switch from star to delta or vice versa. Enabling the turbine to switch more freely between the electrical configurations may increase the efficiency of the turbine, and thus, increase power output while staying within the switching budget.

As shown, method 700 includes a technique for altering the switching frequency or rate of a turbine in order to maintain the total number of switches within a switching budget. The switching budget may be a predefined switching rate (e.g., 3 switches per day) or a total number of switches based on the current age of the turbine. The switching budget may be based on historical data measured from other turbines or experimental data such as a simulation. If the current switching rate or the current number of switches varies from the budget, the controller may adjust the switching criteria in order to realign the switching rate with the switching budget. Method 700 can repeat as continuously or at predefined intervals (e.g., once a day) to determine if the turbine is operating within with the switching budget.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A controller for a wind turbine, the controller comprising control logic configured to:
   upon determining to switch between electrical configurations when operating at a pre-switch rotor speed, decrease an output power produced by a generator in the wind turbine;
   while decreasing the output power, adjust a parameter associated with a rotor of the wind turbine to maintain the speed of the rotor at or above at least one of the pre-switch rotor speed and a desired post-switch rotor speed;
   upon determining that the output power reaches a predefined power value, switch between a first electrical configuration associated with the generator to a second electrical configuration;
   after switching to the second electrical configuration, increase the output power produced by the generator in the wind turbine;
   while increasing the output power, adjust the parameter associated with the rotor to maintain the speed of the rotor at or above at least one of the pre-switch rotor speed and the desired post-switch rotor speed;
   track a number of switches between the first and second electrical configurations;
   compare the number of switches to a switching budget; and
   upon determining the number of switches exceed the switching budget, adjust at least one switching criteria to reduce a switching rate associated with the wind turbine.

2. The controller of claim 1, wherein determining to switch from the first electrical configuration to the second electrical configuration comprises determining that the output power of the generator satisfies a power threshold for a predefined period of time.

3. The controller of claim 2, wherein determining to switch from the first electrical configuration to the second electrical configuration comprises evaluating the output power of the generator to a plurality of different power thresholds associated with respective power values, each power threshold is associated with a different time constraint that determines whether to switch from the first electrical configuration to the second electrical configuration.

4. The controller of claim 1, wherein the first electrical configuration is a delta configuration and the second electrical configuration is a star configuration.

5. The controller of claim 1, wherein the control logic is configured to:
increase the output power of the generator to a desired output power value corresponding to the second electrical configuration, wherein, when the generator outputs the desired output power value, the control logic operates the wind turbine at the desired post-switch rotor speed.

6. The controller of claim 1, wherein adjusting the parameter associated with the rotor to maintain the speed of the rotor at or above a current rotor speed comprises at least one of (i) changing a pitch of a blade in the rotor to compensate for a reduced load associated with the generator and (ii) braking the rotor.

7. A wind turbine, comprising:
a generator;
a rotor coupled to the generator; and
a controller configured to:
upon determining to switch between electrical configurations when operating at a pre-switch rotor speed, decrease an output power produced by the generator,
while decreasing the output power, adjust a parameter associated with the rotor to maintain the speed of the rotor at or above at least one of the pre-switch rotor speed and a desired post-switch rotor speed,
upon determining that the output power reaches a predefined power value, switch between a first electrical configuration associated with the generator to a second electrical configuration,
after switching to the second electrical configuration, increase the output power produced by the generator,
while increasing the output power, adjust the parameter associated with the rotor to maintain the speed of the rotor at or above at least one of the pre-switch rotor speed and the desired post-switch rotor speed,
track a number of switches between the first and second electrical configurations,
compare the number of switches to a switching budget, and
upon determining the number of switches exceed the switching budget, adjust at least one switching criteria to reduce a switching rate associated with the wind turbine.

8. The wind turbine of claim 7, wherein determining to switch from the first electrical configuration to the second electrical configuration comprises determining that the output power of the generator satisfies a power threshold for a predefined period of time.

9. The wind turbine of claim 8, wherein determining to switch from the first electrical configuration to the second electrical configuration comprises evaluating the output power of the generator to a plurality of different power thresholds that define a plurality of different power ranges, each power range is associated with a different time constraint that determines whether to switch from the first electrical configuration to the second electrical configuration.

10. The wind turbine of claim 7, wherein the first electrical configuration is a delta configuration and the second electrical configuration is a star configuration.

11. The wind turbine of claim 7, wherein the control logic is configured to:
increase the output power of the generator to a desired output power value corresponding to the second electrical configuration, wherein, when the generator outputs the desired output power value, the controller operates the wind turbine at the desired post-switch rotor speed.

12. The wind turbine of claim 7, wherein adjusting the parameter associated with the rotor to maintain the speed of the rotor at or above a current rotor speed comprises at least one of (i) changing a pitch of a blade in the rotor to compensate for a reduced load associated with the generator and (ii) braking the rotor.

13. A method for controlling a wind turbine, the method comprising:
upon determining to switch between electrical configurations when operating at a pre-switch rotor speed, decreasing an output power produced by a generator in the wind turbine;
while decreasing the output power, adjusting, by operation of one or more computer processors, a parameter associated with a rotor of the wind turbine to maintain the speed of the rotor at or above at least one of the pre-switch rotor speed and a desired post-switch rotor speed;
upon determining that the output power reaches a predefined power value, switching between a first electrical configuration associated with the generator to a second electrical configuration;
after switching to the second electrical configuration, increasing the output power produced by the generator in the wind turbine;
while increasing the output power, adjusting the parameter associated with the rotor to maintain the speed of the rotor at or above at least one of the pre-switch rotor speed and the desired post-switch rotor speed;
track a number of switches between the first and second electrical configurations;
compare the number of switches to a switching budget; and
upon determining the number of switches exceed the switching budget, adjust at least one switching criteria to reduce a switching rate associated with the wind turbine.

14. The method of claim 13, wherein determining to switch from the first electrical configuration to the second electrical configuration comprises determining that the output power of the generator satisfies a power threshold for a predefined period of time.

15. The method of claim 14, wherein determining to switch from the first electrical configuration to the second electrical configuration comprises evaluating the output power of the generator to a plurality of different power thresholds that define a plurality of different power ranges, each power range is associated with a different time constraint that determines whether to switch from the first electrical configuration to the second electrical configuration.

16. The method of claim 13, wherein the first electrical configuration is a delta configuration and the second electrical configuration is a star configuration.

17. The method of claim 13, wherein adjusting the parameter associated with the rotor to maintain the speed of the rotor at or above a current rotor speed comprises at least one of (i) changing a pitch of a blade in the rotor to compensate for a reduced load associated with the generator and (ii) braking the rotor.

* * * * *